(12) United States Patent
Van Der Schuit (10) Patent No.: US 11,111,114 B2
(45) Date of Patent: Sep. 7, 2021

(54) EXPANDABLE HEAVY EQUIPMENT, ELONGATED PULL ELEMENT, AND USE OF EXPANDABLE HEAVY EQUIPMENT

(71) Applicant: Cabin Air Group B.V., Joure (NL)

(72) Inventor: Rinze Jan Van Der Schuit, Oranjewoud (NL)

(73) Assignee: Cabin Air Group B.V., Joure (NL)

( * ) Notice: Subject to any disclaimer, the term of this patent is extended or adjusted under 35 U.S.C. 154(b) by 0 days.

(21) Appl. No.: 16/963,870

(22) PCT Filed: Jan. 23, 2019

(86) PCT No.: PCT/NL2019/050040
§ 371 (c)(1),
(2) Date: Jul. 22, 2020

(87) PCT Pub. No.: WO2019/147128
PCT Pub. Date: Aug. 1, 2019

(65) Prior Publication Data
US 2021/0002106 A1 Jan. 7, 2021

(30) Foreign Application Priority Data
Jan. 25, 2018 (NL) .................................... 2020319

(51) Int. Cl.
*B66C 23/42* (2006.01)
*B66C 23/68* (2006.01)
(Continued)

(52) U.S. Cl.
CPC .............. *B66C 23/42* (2013.01); *B66C 23/68* (2013.01); *B66C 23/823* (2013.01); *F16G 11/12* (2013.01); *B66C 23/344* (2013.01)

(58) Field of Classification Search
CPC ......... B66C 23/34; B66C 23/42; B66C 23/68; B66C 23/82; B66C 23/344; B66C 23/821;
(Continued)

(56) References Cited

U.S. PATENT DOCUMENTS

| | | | | |
|---|---|---|---|---|
| 995,159 A | * | 6/1911 | Lansden | D07B 1/02 182/190 |
| 3,134,488 A | * | 5/1964 | Brekelbaum | B66C 23/344 212/295 |
| 3,246,769 A | * | 4/1966 | Noll | B66C 23/26 212/295 |
| 3,794,184 A | * | 2/1974 | Higgins | B66C 23/34 212/295 |

(Continued)

FOREIGN PATENT DOCUMENTS

DE 20200806167 U1 7/2008
DE 202012102522 U1 10/2013
(Continued)

*Primary Examiner* — Michael R Mansen
*Assistant Examiner* — Juan J Campos, Jr.
(74) *Attorney, Agent, or Firm* — Rogowski Law LLC (57) ABSTRACT

Expandable heavy equipment 1, comprising a first frame element 5, a connector 11, at least one elongated pull element 14, and further frame elements 7. The pull element 14 is connected to the first frame element 5 with a first coupler 31 and to one 9 of the further frame elements 7 with a second coupler 35. The pull element 14 is in a folded state in a transport condition and in an extended state in a working condition. The pull element 14 comprises load bearing fibers/fibres 141 extending from the first coupler 31 to the second coupler 35. The pull element 14 comprises at least one flexible part 43 and at least two stiff parts 45. The flexible part 43 has a lower bending stiffness than the two stiff parts 45 and enables the pull element 14 to be arranged in the folded state.

20 Claims, 5 Drawing Sheets

(51) Int. Cl.
*B66C 23/82* (2006.01)
*F16G 11/12* (2006.01)
*B66C 23/34* (2006.01)

(58) Field of Classification Search
CPC ... B66C 23/823; B66C 23/825; B66C 23/826; B66C 23/828; F16G 11/12; D07B 1/02; D07B 1/025; D07B 1/04; D07B 1/16; D07B 1/162; D07B 2201/1092; D07B 2201/2009; D07B 2201/2014; D07B 2201/2088; D07B 2201/2092; D07B 2201/2066; D07B 2205/2014; D07B 2205/205; D07B 2205/2046; D07B 2205/20–2096; D07B 2205/3007; D07B 2201/201; D07B 2201/2068; D07B 2201/2089; D07B 5/005
See application file for complete search history.

(56) References Cited

U.S. PATENT DOCUMENTS

| | | | | |
|---|---|---|---|---|
| 4,534,163 | A | * | 8/1985 | Schuerch ............ D07B 1/04 57/233 |
| 2002/0096484 | A1 | | 7/2002 | Bertinotti |
| 2004/0060887 | A1 | * | 4/2004 | Willim ............ B66C 23/828 212/348 |
| 2017/0100855 | A1 | * | 4/2017 | Taylor ............ B29C 43/003 |
| 2018/0334776 | A1 | | 11/2018 | Van Der Schuit |

FOREIGN PATENT DOCUMENTS

| | | | | |
|---|---|---|---|---|
| EP | 1225152 | A1 | | 7/2002 |
| FR | 1031530 | A1 | * | 8/2000 ............ B66C 23/26 |
| JP | 01312142 | A | * | 12/1989 ............ E04C 5/08 |
| WO | 2009135662 | A1 | | 11/2009 |
| WO | 2017086778 | A1 | | 5/2017 |

* cited by examiner

EXPANDABLE HEAVY EQUIPMENT, ELONGATED PULL ELEMENT, AND USE OF EXPANDABLE HEAVY EQUIPMENT

CROSS-REFERENCE TO RELATED APPLICATIONS

This application is a national stage application (under 35 USC § 371) of PCT/NL2019/050040, filed Jan. 23, 2019, claiming priority to NL 2020319, filed Jan. 25, 2018, the contents of each of which are incorporated by reference herein.

BACKGROUND OF THE INVENTION

Technical Field and State of the Art Description

The invention relates to an expandable heavy equipment. A heavy equipment of this type is used for industrial activities, such as construction work, lifting heavy loads, drilling for natural resources, mining, and excavating, including activities in outer space. The word heavy in the phrase heavy equipment relates to the load being displaced or force being exerted by the equipment, as the equipment self may be of heavy weight, but is not necessarily so. Expandable heavy equipment is usually employed on a temporarily basis at a certain site. For the sake of its transport, it can be compacted. On or near the site it is expanded to its working condition. A typical example of an expandable heavy equipment is a self-erecting crane. Other examples are oil derricks, offshore platforms, mining equipment, space stations, and scaffolding.

A known expandable heavy equipment of this type is a self-erecting tower crane. The known self-erecting tower crane has a frame comprising a vertical frame, or tower, and a horizontal frame, or jib. The jib extends at two sides from the tower, and is called main or lifting jib at one side and counter fib at the other side. The part of the tower above the jib is called head. The main jib and the counter jib each comprise multiple elements which are connected by means of pivots. In a transport condition, the elements of the jibs are folded together in a compact arrangement. In a working condition, the elements of the jibs are unfolded and extend next to each other in a horizontal direction. Each jib is suspended by a plurality of pull rods which are interconnected by means of pivots. In the transport condition, the pivots enable the pull rods to be folded together in order to reduce the required transport length. In the working condition, the pull rods extend in one direction from the top of the head to a distal element of the relevant jib.

EP-1.225.152 discloses a tower crane with composite structure, self-assembling, with sections which are hinged together with the use of horizontal hinges, the whole comprising a load-bearing arm made up of several sections hinged together, and a tower composed of at least one pair of sections hinged together and at least one section which can be inserted into or telescoped from one of the other sections, and with tie rods which work with the aforesaid arm.

A disadvantage of the known expandable heavy equipment is that the equipment itself has a relative large weight which reduces the payload of the expandable heavy equipment of a given size. Another disadvantage is that the known expandable heavy equipment is complex.

The invention aims to solve at least one of these problems, or at least to provide an alternative. In particular, the invention aims to provide an expandable heavy equipment with a reduced own weight and/or to reduce the number of parts.

SUMMARY OF THE INVENTION

An expandable heavy equipment comprises a frame with a first frame element, a connector, at least one elongated pull element, and further frame elements. The further frame elements comprise at least a second frame element. The connector is arranged for connecting the first frame element and the second frame element. The pull element comprises a first coupler at a first end and a second coupler at a second end opposite of the first end, and is connected at the first end to the first frame element with the first coupler and at the second end to one of the further frame elements with the second coupler. A transport condition is defined wherein the first frame element and the second frame element are arranged compact together and a working condition is defined wherein the first frame element and the second frame element occupy more space in at least one direction than in the transport condition. The connector allows a movement of the first frame element and the second frame element with respect to each other from the transport condition to the working condition. The pull element is in a folded state in the transport condition and in an extended state in the working condition. The pull element is designed to transfer a pull force in the working condition from the first frame element to the one of the further frame elements. The pull element comprises load bearing fibers/fibres extending from the first coupler to the second coupler. The pull element comprises at least one flexible part and at least two stiff parts, the flexible part having a lower bending stiffness than the two stiff parts and being arranged between the two stiff parts. The flexible part enables the pull element to be arranged in the folded state.

Load bearing fibers/fibres have a better weight-to-load ratio than pull rods. The alternation of stiff and flexible parts enables the inventive pull element to be folded, wherein a complete stiff pull element could not be folded at all, and a complete flexible pull element would turn into a disorderly heap of loops, instead of being folded up. Thus, the alternation of stiff and flexible parts obviates the need for pivots in the pull element. Both the better weight-to-load ratio and the lack of pivots results in a lighter pull element than the combination of pull rods in the known expandable heavy equipment. As a result, either the frame of the expandable heavy equipment can be constructed lighter as well for the same pay-load, or the expandable heavy equipment can bear a higher load than the expandable heavy equipment with the same frame but with the known pull rods. Moreover, the inventive pull element consists of less parts than the known pull rods.

In an embodiment, the pull element comprises compression means, and the compression means are arranged to compress the section of the load bearing fibers/fibres extending through the at least two stiff parts into a more compact arrangement than the section of the load bearing fibers/fibres extending through the flexible part. By applying compression means in a relative loose manner around a section of the load bearing fibers/fibres, or not applying compression means at all, the load bearing fibers/fibres are not substantially compressed and relevant section of the pull elements is relative flexible, i.e. as flexible as the specific load bearing fibers/fibres allow. By applying compression means in a tight manner around a section of the load bearing fibers/fibres, the load bearing fibers/fibres are compressed together, resulting in a relative stiff section of the pull element. By compressing sections of the load bearing fibers/fibres of the pull element not, or less in at least one section, than in other sections, the compression means result in the inventive alternation of flexible and stiff parts.

In an embodiment, the pull element comprises tape, provided helical around the load bearing fibers/fibres in at least the two stiff parts. Applying tape is in itself preferred, as it bundles the load bearing fibers/fibres in a compact manner. By applying the tape in a relative loose manner, the load bearing fibers/fibres are not substantially compressed and the pull elements is relative flexible, i.e. as flexible as the specific load bearing fibers/fibres allow. By applying the tape under tension, the tape functions as compression means, and the load bearing fibers/fibres are compressed together, resulting in a relative stiff pull element. By compressing sections of the load bearing fibers/fibres of the pull element more than in other sections, the tape results in the inventive alternation of flexible and stiff parts.

In a particular embodiment, the tape which is provided in the at least two stiff parts is different from the tape in the flexible part, and more in particular, the tape which is provided in the at least two stiff parts is wider and/or thicker and/or has a higher modulus of elasticity, than the tape which is provided in the flexible part. These differences in properties support the compression of the load bearing fibers/fibres.

In an embodiment, the pull element comprises a sleeve, arranged circumferential/circumferentially around the pull element, in particular the sleeve has a lower bending stiffness in the flexible part than in the two stiff parts, more in particular the sleeve in the two stiff parts comprises a fibre-reinforced plastic, more in particular a fibre-reinforced epoxy. A sleeve in itself protects the load bearing fibers/fibres of the pull element against an environment influence, such as exposure of sunlight, water or dirt on the load bearing fibers/fibres and/or the impact of an object against the pull element.

In an embodiment, the pull element comprises a resin between the load bearing fibers/fibres which is cured in the at least two stiff parts. The resin may be applied along the full length of the pull element, or just at the stiff parts. In either case, the resin is cured at the at least two stiff parts only, in order to make the load bearing fibers/fibres stiff. This is an simple way of making parts of the pull element more stiff than the flexible parts. In particular, the load bearing fibers/fibres are carbon fibers/fibres and the resin is cured by applying an increased temperature.

In an embodiment, the expandable heavy equipment is a self-erecting heavy equipment, and further comprises a drive for erecting the heavy equipment. This obviates the need for external equipment to erect the expandable heavy equipment.

In particular, the expandable heavy equipment is a self-erecting crane, in particular a self-erecting tower crane, comprising a tower and a jib. More in particular, the one of the further frame elements is a base or a head of the tower and the first frame element is a part of the jib. The jib of a tower crane is suspended by a relative long pull element. Thus the inventive pull element results in a relative large weight reduction.

In an embodiment, the load bearing fibers/fibres of the pull element extend from the first coupler to the second coupler, turn around the second coupler, extend from the second coupler to the first coupler, and turn around the first coupler, such as to form a semi-continuous loop. Such a semi-continuous loop results in an effective use of the load bearing fibers/fibres, as the first and second couplers are embedded within the loop and thus little auxiliary tools are required to connect the couplers to the load bearing fibers/fibres. Moreover, the formation of a semi-continuous loop enables the use of specific types of synthetic fibers/fibres, in particular synthetic fibers/fibres which are sensitive for compression and/or have a low mutual friction.

The term semi-continuous loop refers to the fact that the fibers/fibres have a finite length with distinct ends, while in a continuous loop a fibre would have no ends. So in a semi-continuous loop, the fibers/fibres are wound around the first and second coupler a plurality of times, forming a plurality of loops around these couplers, which is not completely continuous as the ends of the yarn are not connected to each other. It is noted that in practice fibers/fibres are most often provided as a yarn comprising a plurality of individual fibers/fibres, and that it is an individual yarn, or a plurality of yarns, what is/are wound around the first and second couplers in order to form the pull element.

In an embodiment, at least one of the first and second coupler comprises a thimble, and in particular further comprises a matching pin. The relevant pin may have any shape, such as a straight pin, or a U-shaped pin as in a shackle. A thimble, in particular in combination with a pin, provides for a simple and effective connection to a frame element.

In an embodiment, the load bearing fibers/fibres comprise carbon fibers/fibres and/or synthetic fibers/fibres, in particular the synthetic fibers/fibres are Ultra High Molecular Weight Polyethylene fibers/fibres (UHMWPE fibers/fibres). A yarn with such fibers/fibres is sold under the registered trademark Dyneema™. Such fibers/fibres provide a high load to weight ratio.

In another embodiment, the synthetic fibers/fibres are aramid fibers/fibres, more in particular aramid fibers/fibres coated with a wax. Aramid fibers/fibres provide a high load to weight ratio too. The wax reduces the wear of the aramid fibers/fibres, as it reduces the mutual friction of the fibers/fibres in the pull element.

In an embodiment, the connector is a pivot. In the context of this document, a pivot is defined as any structure which enables a pivoting connection between two frame elements. In an embodiment, the connector is a slider. In the context of this document, a slider is defined as any structure which enables a sliding connection between two frame elements. In particular, the expandable heavy equipment comprises different types of connectors.

In an embodiment, the expandable heavy equipment further comprises a drive for moving the expandable heavy equipment and/or for lifting a load.

Preferably, the expandable heavy equipment is expanded by unfolding, i.e. by pivoting the respective frame elements with respect to each other. In another embodiment, the expandable heavy equipment is expanded by sliding of the respective frame elements with respect to each other. In yet another embodiment, the heavy equipment is expanded by partly unfolding and partly by sliding.

A pull element for an expandable heavy equipment according to the invention comprises load bearing fibers/fibres extending along the length of the pull element, at least one flexible part and at least two stiff parts, the flexible part having a lower bending stiffness than the two stiff parts and being arranged between the two stiff parts, and the flexible part enables the pull element to be arranged in the folded state.

The pull element for an expandable heavy equipment according to the invention achieves the same or similar effects as described above in relation to the expandable heavy equipment, resulting in a lighter pull element for an expandable heavy equipment than the known pull elements.

A pull element according to the invention, either per se or as part of an expandable heavy equipment, is designed to bear a pull force and substantially no push force. In particular, the maximum push load is less than 25%, more in particular less than 10%, more in particular less than 5% of the maximum pull load on the pull element. A push force is used in practice to fold the pull element, although the absence of a pull force will initiate folding already.

The flexible part of a pull element according to the invention, either per se or as part of an expandable heavy equipment, is in particular shorter than one of the stiff parts.

A use of an expandable heavy equipment comprises the steps of:

providing an expandable heavy equipment according to the invention, wherein in particular the expandable heavy equipment is provided in the transport condition with the pull element in the folded state, followed by moving the first frame element and the second frame element with respect to each other from the transport condition to the working condition, and substantially simultaneously unfolding the pull element from the folded state in the transport condition to the extended state in the working condition, and/or the expandable heavy equipment is provided in the working condition with the pull element in the extended state, followed by moving the first frame element and the second frame element with respect to each other from the working condition to the transport condition, and substantially simultaneously folding the pull element from the extended state in the working condition to the folded state in the transport condition.

The use according to the invention results in employing an expandable heavy equipment which has a lower own weight for a given pay-load than a known expandable heavy equipment for the same pay-load.

DESCRIPTION OF THE DRAWINGS

The invention, its effects, and advantages will be explained in more detail on the basis of the schematic drawing, in which.

DETAILED DESCRIPTION

Figure 1:
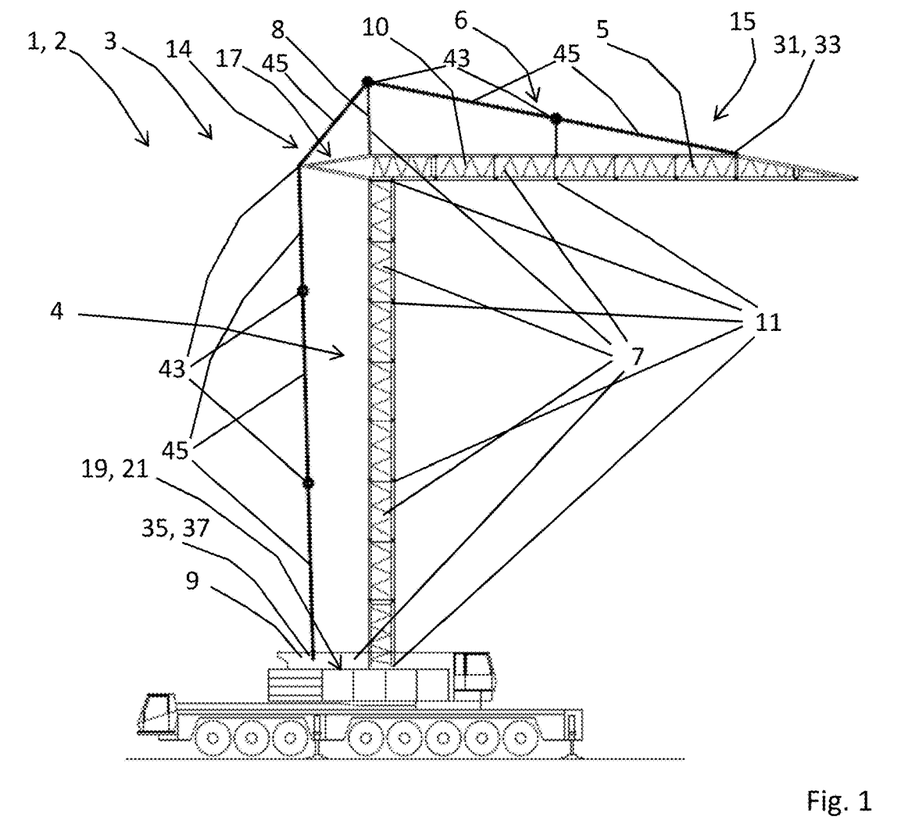
FIG. 1 shows a self-erecting tower crane according to the invention in an unfolded, or working condition.
Figure 2:
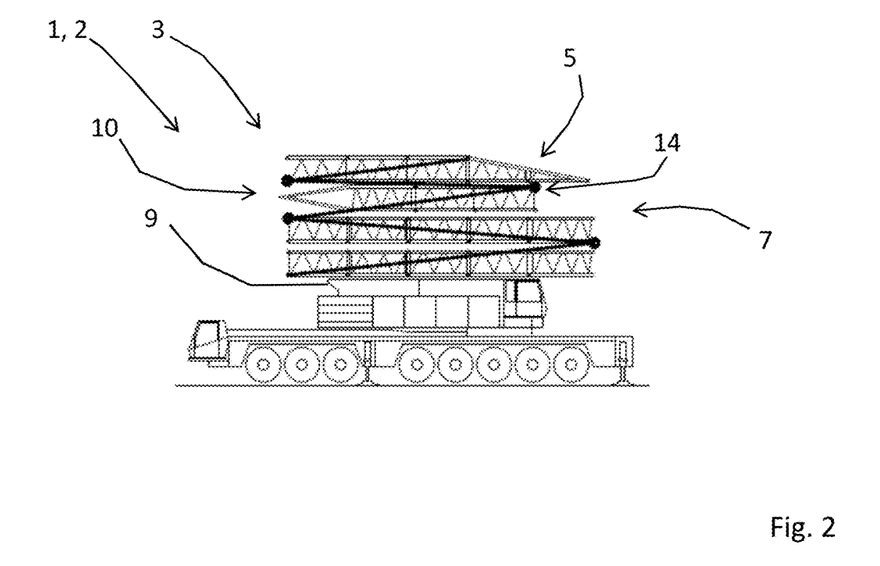
FIG. 2 shows the self-erecting tower crane of FIG. 1 in a folded, or transport condition.

The FIGS. 1 and 2 show an expandable heavy equipment, according to the invention, which is denoted in its entirety by reference number 1. The expandable heavy equipment 1 is in this embodiment a self-erecting crane, in particular a self-erecting tower crane 2. The self-erecting tower crane 2 comprises a frame 3 with a tower 4, a first frame element 5, which in this embodiment is a part of a jib 6, further frame elements 7 which comprise a head 8 and base 9, and a second frame element 10, which in this embodiment is part of the jib 6 too. The frame 3 further comprises a plurality of connectors 11, which in this embodiment are bolts and nuts (not shown in detail), and an elongated pull element 14. The bolts and nuts are arranged for connecting the first frame element 5 with the second frame element 10, as well as the further frame elements 7, including the head 8 and the base 9 to each other. The jib 6 comprises a main jib 15 and a counter jib 17.

The self-erecting tower crane 2 of this embodiment further comprises a drive 19 for erecting the self-erecting tower crane 2. In this embodiment, the same drive 21 is designed for moving the self-erecting tower crane 2 and for lifting a load via a lifting cable and hook (not shown).

The pull element 14 comprises a first coupler 31 at a first end 33 and a second coupler 35 at a second end 37 opposite of the first end 33 (shown in more detail in FIGS. 3-5, and 11-14). The pull element 14 is connected at the first end 33 to the main jib 15 with the first coupler 31 and at the second end 37 to the base 9 with the second coupler 35. The pull element 14 is designed to transfer a pull force from the main jib 15, via the head 8 and the counter jib 17 to the base 9. The pull element 14 comprises load bearing fibers/fibres (see FIG. 5) extending from the first coupler 31 to the second coupler 35. The pull element 14 of this embodiment comprises four flexible parts 43 and five stiff parts 45. The flexible parts 43 are indicated by means of rounds in FIGS. 1 and 2 for the sake of clarity of the drawing, but the actual flexible parts are flush with the stiff parts, as will be shown in FIGS. 3 and 4.

A transport condition is defined wherein the frame elements 4, 5, 6, 7, 8, 9, 10 are arranged compact together (see FIG. 2) and a working condition is defined wherein the frame elements occupy more space in both a horizontal and a vertical direction than in the transport condition (see FIG. 1). The connectors 11 allow a movement of the frame elements with respect to each other from the transport condition to the working condition, in this embodiment by disconnecting the relevant frame elements from each other by removing the bolts so the frame elements can move freely with respect to each other. The pull element 14 is in a folded state in the transport condition (FIG. 2) and in an extended state in the working condition (FIG. 1).

Figure 3:
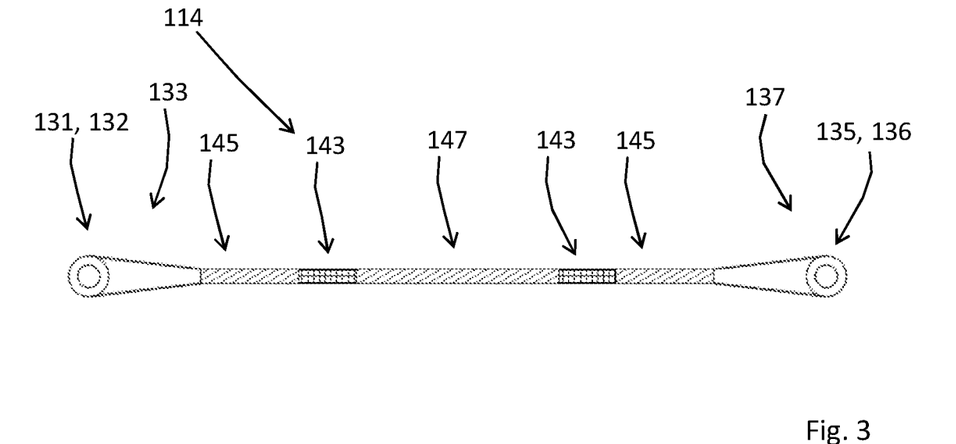
FIG. 3 shows a pull element according to the invention in an extended stated.
Figure 4:
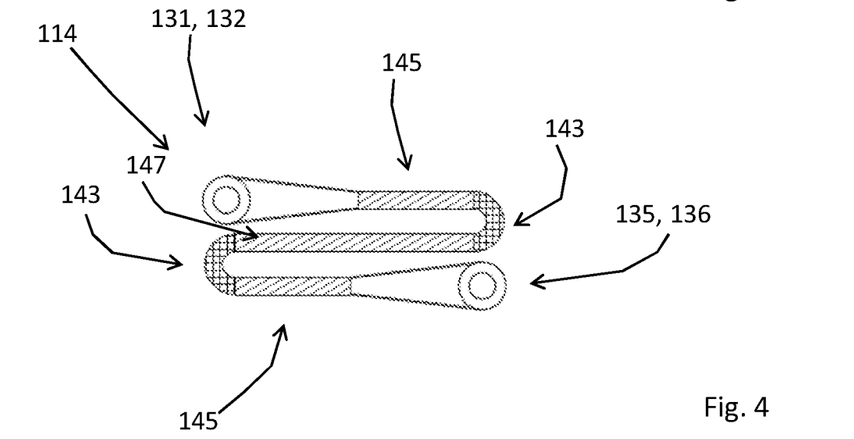
FIG. 4 shows the pull element of FIG. 3 in a folded state.
Figure 5:
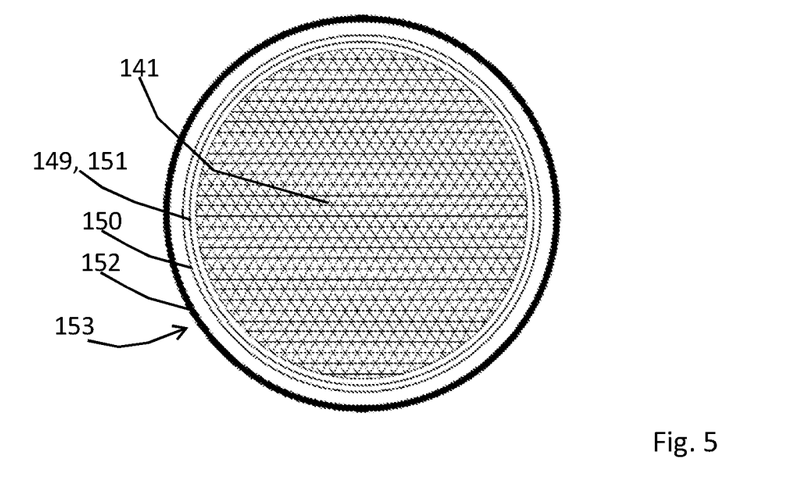
FIG. 5 shows a cross section of the pull element of FIGS. 3 and 4.
Figure 6:
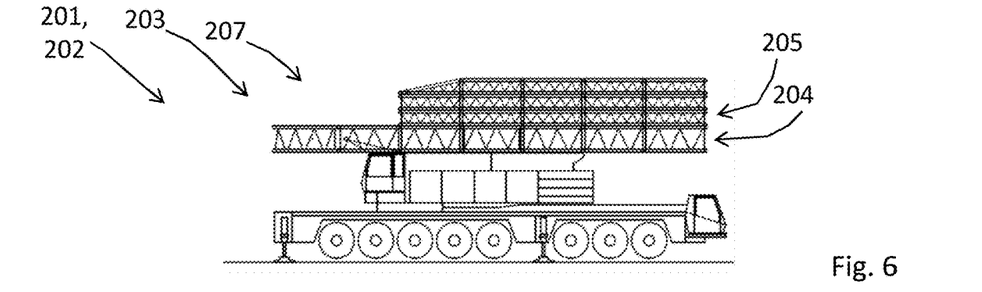
FIG. 6 shows another self-erecting tower crane according to the invention in a folded, or transport condition.

A pull element 114 according to the invention is shown in more detail in FIGS. 3-5. The pull element 114 has less flexible and stiff parts than, but is further similar to, the pull element 14 of FIGS. 1-2. The pull element 114 comprises a first coupler 131, in this embodiment comprising a first thimble 132, at a first end 133, and a second coupler 135, in this embodiment comprising a second thimble 136, at a second end 137. The thimbles 132, 136 are designed to be connected to a frame element via a matching pin 138 (see FIG. 12, not shown in FIG. 3).

The pull element 114 comprises load bearing fibers/fibres 141 (see FIGS. 5 and 13) for transferring a pull force from one frame element to another frame element. The load bearing fibers/fibres 141 extend from the first thimble 132 to the second thimble 136. The load bearing fibers/fibres 141 comprise synthetic fibers/fibres, in this embodiment Ultra High Molecular Weight Polyethylene fibers/fibres (UHMWPE), sold under the trademark Dyneema™. The load bearing fibers/fibres 141 extend from the first thimble 132 to the second thimble 136, turn around the second thimble 136, extend from the second thimble 136 to the first thimble 132, and turn around the first thimble 132.

The pull element 114 of this embodiment comprises two flexible parts 143 and three stiff parts 145, 147. The flexible parts 143 have a lower bending stiffness than the stiff parts 145, 147 and are arranged between the stiff parts 145, 147. The flexible parts 143 enables the pull element 114 to be arranged in a folded state (see FIG. 4). It is noted that the flexible parts 143 and stiff parts 145, 147 are displayed in FIGS. 3 and 4 with a different shading for illustrative purposes only, as the relevant parts of the actual product will not look substantially different from the outside.

FIG. 5 shows an enlarged and schematic cross section of the pull element 114. It is to be noted that the different layers are shown apart for the sake of clarity of this drawing, but that the layers of the actual product abut. The individual fibers/fibres 141 have such a small cross section that they cannot be shown on this scale in any of the figures, and are shown schematically only.

Figure 11:
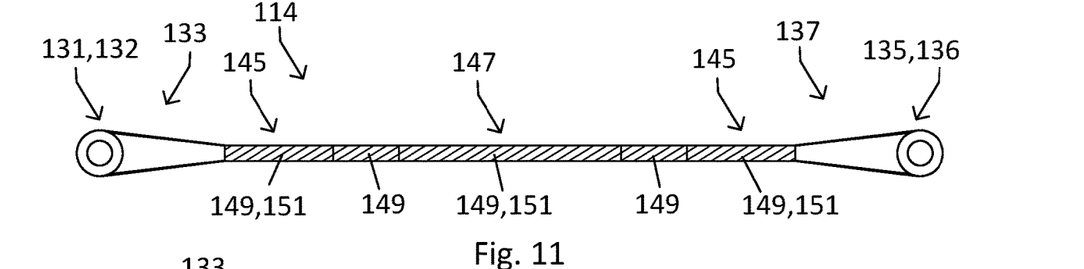
FIG. 11 shows the pull element of FIG. 3 without a sleeve.
Figure 12:
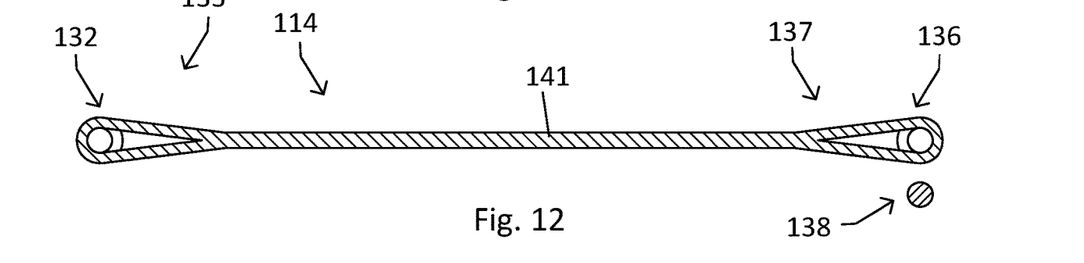
FIG. 12 shows a longitudinal section through the pull element of FIG. 3, FIG. 13, shows an alternative embodiment of a pull element in an extended stated.

The pull element 114 of this embodiment comprises compression tape 149 and seal tape 150, provided helical around the load bearing fibers/fibres 141 in order to bundle the load bearing fibers/fibres (FIGS. 5 and 11). In this embodiment the compression tape 149 functions as compression means 151 too. The compression tape 149 is arranged to compress the section of the load bearing fibers/fibres 141 extending through the stiff parts 145, 147 into a more compact arrangement than the section of the load bearing fibers/fibres 141 extending through the flexible parts 143. For this purpose, the compression tape 149 is provided with a higher tension around the load bearing fibers/fibres 141 in the stiff parts 145, 147, than around the load bearing fibers/fibres 141 in the flexible parts 143.

The pull element 114 of this embodiment further comprises a braided cover 152. The braided cover and the seal tape 150 form together a sleeve 153, arranged circumferential/circumferentially around the pull element 114. The sleeve 153 protects the load bearing fibers/fibres 141 against environmental influences. In this embodiment, the braided cover 152 protects the load bearing fibers/fibres 141 against sun light and impact by objects. The seal tape 150 protects the load bearing fibers/fibres 141 against dirt, and water.

The FIGS. 6-10 show an expandable heavy equipment, according to the invention, which is in this embodiment a self-erecting crane, in particular a self-erecting tower crane 202. The self-erecting tower crane 202 comprises a frame 203 with a tower 204, a first frame element 205, which in this embodiment is a part of a jib 206, further frame elements 207 which comprise a head 208 of the tower 204 and a base 209, and a second frame element 210, which in this embodiment is part of the jib 206 too. In this embodiment, the head 208 comprises two elements extending under an oblique angle with respect to each other, which are capable of transferring a push load and are shown in the figures schematically only.

Figure 8:
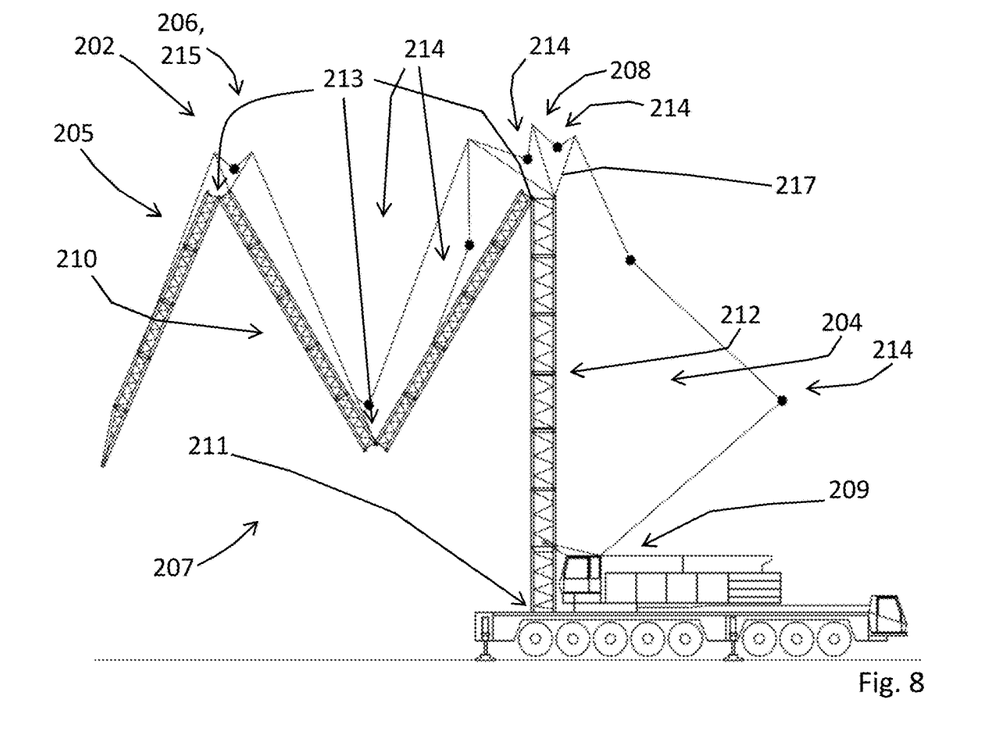
Figure 9:
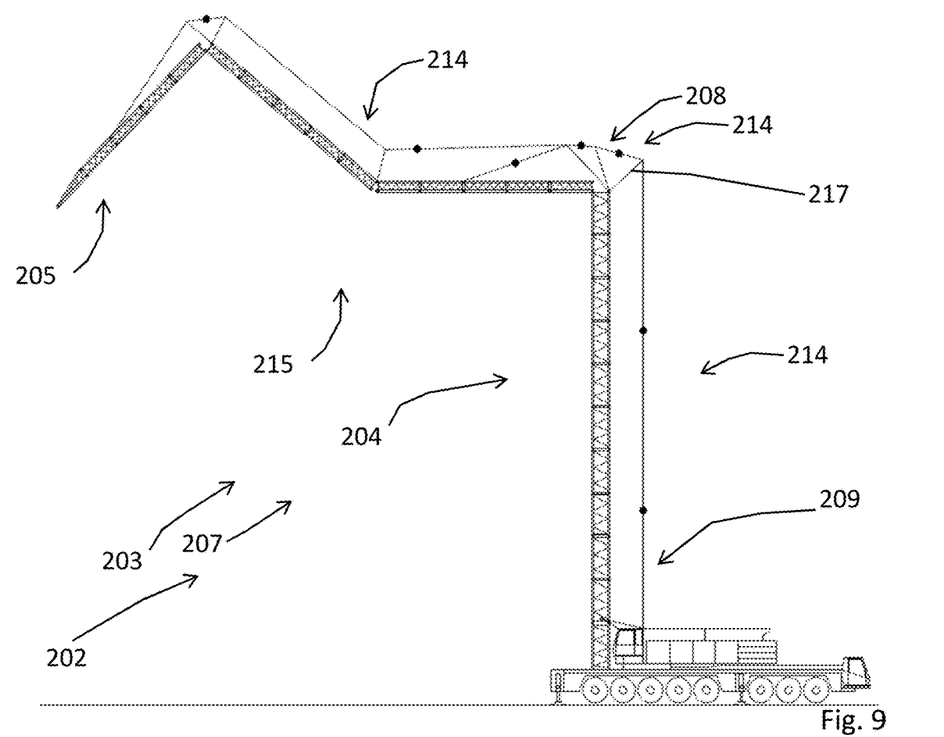
Figure 10:
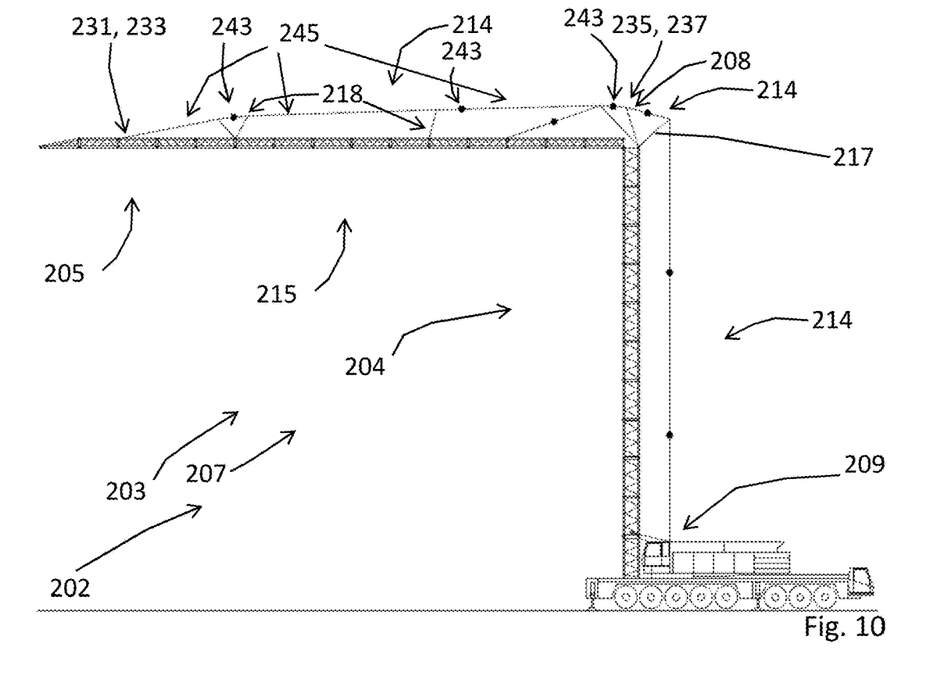
FIG. 10 shows the self-erecting tower crane of FIG. 6 in an unfolded, or working condition.

The frame 203 further comprises a plurality of connectors (not shown in detail), which in this embodiment comprises bolts and nuts 211, a slider 212, and pivots 213, as well as multiple elongated pull elements 214. The pivots 213 are arranged for pivotable connecting the first frame element 205 with the second frame element 210, and for pivotable connecting the jib 206 with the tower 204. The bolts 211 connect the tower 204 and the base 209 to each other. The slider 212 allows nested elements of the tower 204 to slide in a longitudinal direction with respect to each other, to extend the length of the tower 204 from a retracted length in the transport position (FIGS. 6-8) to an extended length in the working position (FIGS. 9 and 10). It is noted that the slidable elements of the tower 204 are considered to be first and second frame elements within the context of the current invention too. Likewise, other adjacent elements which are connected movable by a connector 211, 212, 213, such as the tower 204 and the base 209, and the head 208 and the jib 206, are considered to be first and second frame elements within the context of the current invention too.

The jib 206 comprises a main jib 215, a counter jib 217, and three elongated spacers 218. The spacers 218 are provided for keeping the elongated pull element 214 at a distance from the jib 206.

The self-erecting tower crane 202 of this embodiment further comprises a drive 219 for erecting the self-erecting tower crane 202. In this embodiment, the same drive 221 is designed for moving the self-erecting tower crane 202 and for lifting a load via a lifting cable and hook (not shown).

Each pull element 214 comprises a first coupler 231 at a first end 233 and a second coupler 235 at a second end 237 opposite of the first end 233 (only indicated for one of the pull elements in FIG. 10). One of the pull elements 214 is connected at the first end 233 to the first frame element, which in this embodiment is a distal part of the main jib 215, with the first coupler 231 and at the second end 237 to the head 208 of the tower 204 with the second coupler 235. The pull element 214 is designed to transfer a pull force from the main jib 215 to the head 208. Further pull elements 214 transfer the, load via the counter jib 217 to the base 209. Each pull element 214 comprises load bearing fibers/fibres (not shown in this embodiment) extending from the first coupler 231 to the second coupler 235. Each pull element 214 comprises at least one flexible part 243 and at least two stiff parts 245. The flexible parts 243 are indicated by means of rounds in FIGS. 6-10 for the sake of clarity of the drawing, but the actual flexible parts are flush with the stiff parts. In an alternative embodiment, two or more of the shown elongated pull elements form one elongated pull element.

Figure 7:
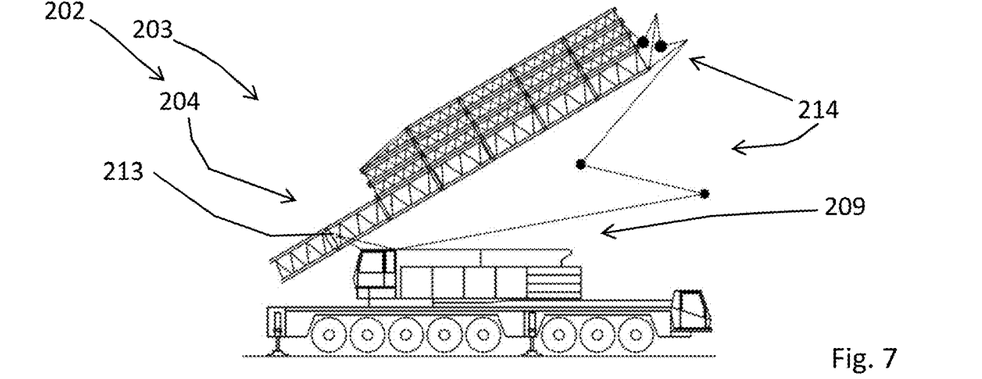
FIGS. 7-9 show the self-erecting tower crane of FIG. 6 in intermediate conditions.

A transport condition is defined wherein the frame elements 204, 205, 206, 207, 208, 209, 210, 215, 217, 218 are arranged compact together (see FIG. 6) and a working condition is defined wherein the frame elements occupy more space in both a horizontal and a vertical direction than in the transport condition (see FIG. 10). The connectors 211, 212, 213 allow a movement of the frame elements with respect to each other from the transport condition to the working condition, vice versa, as shown in FIGS. 7-9: the pivots 213 allow a pivoting motion between the frame elements forming the jib 206, between the jib 206 and the tower 204, and between the tower 204 and the base 209; the slider 212 allows the elements of the tower 204 to slide with respect to each other to extend or to retract; and the bolts and nuts 211 allow (dis)connecting the bottom of the tower 204 to the base 209, so they can either move freely with respect to each other, or are connected fixedly. The pull element 214 is in a folded state in the transport condition (FIG. 6) and in an extended state in the working condition (FIG. 10).

An expandable heavy equipment, such as the self-erecting tower crane 2 or 202 which have been described above, is used as follows. The self-erecting tower crane in the transport condition is transported to the site where installation or construction work is required. In this condition, the frame elements are stowed together in a compact way, and the pull element is (or multiple pull elements are) in a folded state. The different frame elements are moved with respect to each other from the transport condition to the working condition, e.g. by pivoting them about their respective pivot, by sliding them along each other, and/or by moving them separate from each other until they abut in their working condition so that they can be connected, for instance via nuts and bolts. Preferably simultaneously, or immediate after the moving of the frame elements, the pull element(s) is/are unfolded from the folded state in the transport condition to the extended state in the working condition.

After completion of the installation or construction work, the expandable heavy equipment, such as the self-erecting tower crane 2, or 202, is returned from the working condition with the pull element in the extended state, to the transport condition with the pull element in the folded state. The connectors between the different frame elements are detached such that the frame elements can pivot, slide, or move freely with respect to each other to the transport condition. Either shortly before that, or during the moving of the frame elements, the pull element is (or the pull elements are) folded from the extended state in the working condition to the folded state in the transport condition.

Several variants are possible within the scope of the attached claims. The features of the above described preferred embodiment(s) may be replaced by any other feature within the scope of the attached claims, such as the features described in other embodiments, and in the following paragraphs.

In an embodiment, one pull element according to the invention extends from the main jib to the head of the tower, and/or another pull element according to the invention extends from the head of the tower to the counter jib, and/or a further pull element according to the invention extends from the counter jib to the base.

In an embodiment, a (self-erecting) oil derrick, offshore platform, scaffolding, or other expandable heavy equipment comprises a pull element according to the invention. The type of frame element supported by the pull element depends on the type of equipment. Such types include, but are not limited to uprights, masts, platforms, and beams. In general, the pull element according to the invention is suitable for replacing the pull rods of existing types of equipment.

In an embodiment, an expandable heavy equipment requires auxiliary equipment, such as a separate crane, to install or demobilize the expandable heavy equipment. In an embodiment, the expandable heavy equipment requires separate transport means, such as a deep loader or a barge, to be transported.

Figure 13:
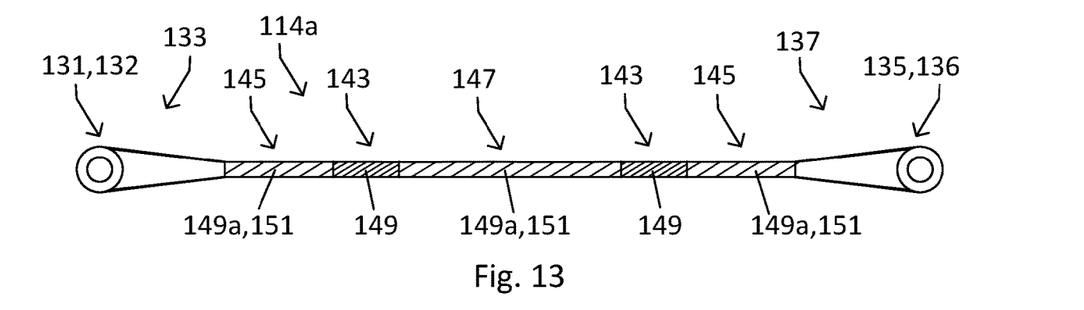
Figure 14:
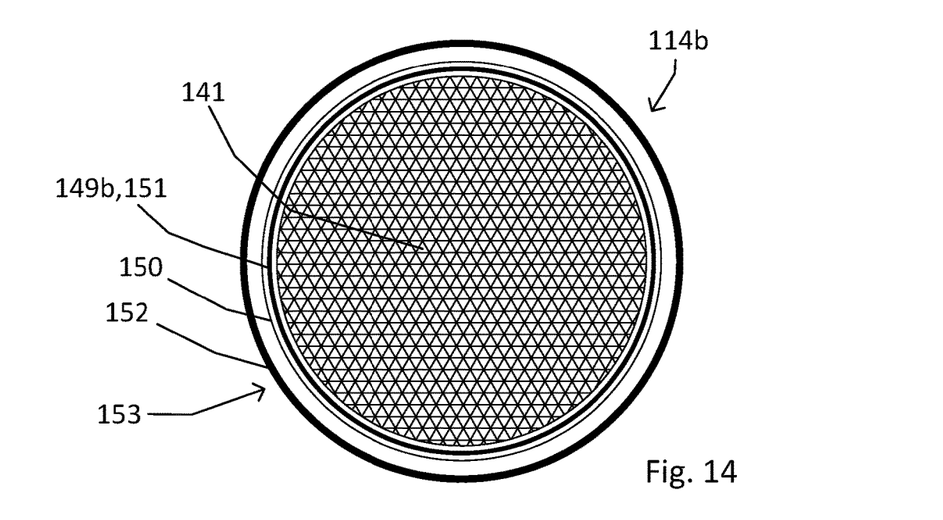
FIG. 14 shows a cross section of another alternative embodiment of a pull element.

While the above described examples of expandable heavy equipment are provided with a pull element as shown in FIGS. 3-5, and 11-12, the described and other expandable heavy equipment are provided in alternative embodiments with other embodiments of the inventive pull element, within the scope of the attached claims, examples of which are given below with reference to FIGS. 13 and 14.

In an embodiment, the load bearing fibers/fibres comprise aramid fibers/fibres, in particular aramid fibers/fibres coated with a wax. In an embodiment, the load bearing fibers/fibres comprise basalt fibers/fibres or metal fibers/fibres. In an embodiment the load bearing fibers/fibres or yarns with load bearing fibers/fibres have a length which corresponds to the length of the pull element. In this embodiment, the load bearing fibers/fibres do not form a loop around the connectors as described in the detailed description, but just extend from one connector to the other.

In an embodiment, the load bearing fibers/fibres are carbon fibers/fibres with a resin. The resin is cured by baking the at least two stiff parts. In particular, the pull element does not comprise compression means. In a variant, the pull element does comprise compression means.

In an embodiment, the compression means are a plastic or metal foil, or a rope or yarn helically wrapped around the load bearing fibers/fibres. In an embodiment, the tape which is provided in the at least two stiff parts is different from the tape in the flexible part. In particular, the tape which is provided in the at least two stiff parts is wider and/or thicker than the tape which is provided in the flexible part. FIG. 13 shows an embodiment of a pull element 114a wherein the compression tape 149a of the three stiff parts 145, 147 is wider than the compression tape 149 which is applied to the flexible parts 143. FIG. 14 shows an embodiment of a pull element 114b wherein the compression tape 149b of the three stiff parts 145, 147 is thicker than the compression tape 149 which is applied to the flexible parts 143, such as the compression tape 149 shown in FIG. 5. As the other features of these two embodiments are the same as, or similar to, the embodiment described above in relation to FIGS. 3-5, the relevant description will not be repeated and the same reference numbers are applied. In an embodiment, two layers of compression tape are provided in the stiff parts. In an embodiment, no compression tape is present around the load bearing fibers/fibres at the flexible parts.

In an embodiment the sleeve has a lower bending stiffness in the flexible part than in the two stiff parts, in particular the sleeve in the two stiff parts comprises a fibre-reinforced plastic, more in particular a fibre-reinforced epoxy. In an embodiment, the sleeve is formed as one piece, instead of by a separate braided cover and seal tape. In particular, the pull element does not comprise compression means. In a variant, the pull element does comprise compression means.

In an embodiment, a clamp around each end of the pull element, or a rod extending transverse from each end of the pull element, is used as a coupler. In an embodiment, different types of couplers are used at the different ends of one pull element.

In the preferred embodiments, each elongated pull element extends in one direction from the first coupler to the second coupler in the working condition. In another embodiment, the elongated pull element shows a small angle at one or more flexible parts in the working condition. A small angle is considered to be an angle in a range of 0-90 degrees, in particular a range of 0-45 degrees, more in particular a range of 0-15 degrees.

The type of connector to connect frame elements is not relevant for the invention, as long as it allows a detachable connection, including sliding connectors, pivotable connectors, bolts and nuts, and pin-hole connectors.

The invention claimed is:
1. Expandable heavy equipment, comprising:
a frame with a first frame element,
a connector,
at least one elongated pull element, and
further frame elements, the further frame elements comprising at least a second frame element, wherein
    the connector is arranged for connecting the first frame element and the second frame element,
    the elongated pull element comprises a first coupler at a first end and a second coupler at a second end opposite of the first end and has a length between the first end and the second end, and the elongated pull element is connected at the first end to the first frame element with the first coupler and at the second end to one of the further frame elements with the second coupler,
    the first frame element and the second frame element are arranged compact together in a transport condition, and the first frame element and the second frame element occupy more space in at least one direction than in the transport condition in a working condition,
    the connector allows a movement of the first frame element and the second frame element with respect to each other from the transport condition to the working condition,
    the elongated pull element is in a folded state in the transport condition and in an extended state in the working condition,
    the elongated pull element is configured to transfer a pull force in the working condition from the first frame element to the one of the further frame elements,
    the elongated pull element comprises load bearing fibers extending from the first coupler to the second coupler,
    the elongated pull element comprises at least one flexible part and at least two stiff parts along the length of the elongated pull element, the at least one flexible part having a lower bending stiffness than the two stiff parts and the at least one flexible part being arranged between the two stiff parts, and
    wherein the flexible part enables the elongated pull element to be arranged in the folded state by bending over, so that the at least two stiff parts are arranged one over the other, and the at least two stiff parts have such a bending stiffness that they do not bend substantially when the elongated pull element is in the folded state.

2. The expandable heavy equipment according to claim 1, wherein the elongated pull element comprises a sleeve, tape or wrap configured to compress at least a first and second section of the load bearing fibers extending through the at least two stiff parts into a more compact arrangement than a section of the load bearing fibers extending through the flexible part.

3. The expandable heavy equipment according to claim 1, wherein the elongated pull element comprises tape helically arranged around the load bearing fibers in at least the two stiff parts.

4. The expandable heavy equipment according to claim 3, wherein the tape is arranged to compress a section of the load bearing fibers extending through the at least two stiff parts into a more compact arrangement than a section of the load bearing fibers extending through the flexible part.

5. The expandable heavy equipment according to claim 4, wherein the tape which is provided in the at least two stiff parts is different from a second tape in the flexible part.

6. The expandable heavy equipment according to claim 4, wherein the tape which is provided in the at least two stiff parts is wider and/or thicker than the tape which is provided in the flexible part.

7. The expandable heavy equipment according to claim 1, further comprising a sleeve arranged circumferentially around the elongated pull element.

8. The expandable heavy equipment according to claim 7, wherein the sleeve has a lower bending stiffness in the flexible part than in the at least two stiff parts.

9. The expandable heavy equipment according to claim 8, wherein the sleeve in the at least two stiff parts comprises a fibre-reinforced plastic.

10. The expandable heavy equipment according to claim 1, wherein the elongated pull element comprises a resin between the load bearing fibers which is cured in the at least two stiff parts.

11. The expandable heavy equipment according to claim 1, wherein the expandable heavy equipment is self-erecting, and further comprises a drive for erecting the heavy equipment.

12. The expandable heavy equipment according to claim 11, wherein the expandable heavy equipment is a self-erecting tower crane, comprising a tower and a jib, and wherein the one of the further frame elements is a base, or head of the tower, and the first frame element is a part of the jib.

13. The expandable heavy equipment according to claim 1, wherein the load bearing fibers of the elongated pull element extend from the first coupler to the second coupler, turn around the second coupler, then extend from the second coupler to the first coupler, and turn around the first coupler, such as to form a semi-continuous loop.

14. The expandable heavy equipment according to claim 13, wherein at least one of the first coupler and the second coupler comprises a thimble, and further comprises a matching pin.

15. The expandable heavy equipment according to claim 1, wherein the load bearing fibers comprise fibers selected from the group consisting essentially of: carbon fibers, synthetic fibers, Ultra High Molecular Weight Polyethylene fibers, aramid fibers, and aramid fibers coated with a wax.

16. The expandable heavy equipment according to claim 1, wherein the connector is configured for a movable connection between the first frame element and the second frame element with respect to each other.

17. The expandable heavy equipment according to claim 16, wherein the connector is selected from the group consisting essentially of: a pivot and a slider.

18. A method for expanding the expandable heavy equipment according to claim 1 from a transport condition to a working condition, comprising the steps of:
    providing the expandable heavy equipment in the transport condition with the elongated pull element in the folded state, followed by
    moving the first frame element and the second frame element with respect to each other from the transport condition to the working condition, and substantially simultaneously
    unfolding the elongated pull element from the folded state in the transport condition to the extended state in the working condition.

19. A method for retracting the expandable heavy equipment according to claim 1 from the working condition to the transport condition, comprising the steps of:
    providing the expandable heavy equipment in the working condition with the elongated pull element in the extended state, followed by moving the first frame element and the second frame element with respect to each other from the working condition to the transport condition, and substantially simultaneously folding the elongated pull element from the extended state in the working condition to the folded state in the transport condition.

20. Expandable heavy equipment, comprising:

a frame with a first frame element, a connector, at least one elongated pull element, and further frame elements, the further frame elements comprising at least a second frame element, wherein the connector is arranged for connecting the first frame element and the second frame element, the elongated pull element comprises a first coupler at a first end and a second coupler at a second end opposite of the first end and has a length between the first end and the second end, and the elongated pull element is connected at the first end to the first frame element with the first coupler and at the second end to one of the further frame elements with the second coupler, the first frame element and the second frame element are arranged compact together in a transport condition, and the first frame element and the second frame element occupy more space in at least one direction than in the transport condition in a working condition, the connector allows a movement of the first frame element and the second frame element with respect to each other from the transport condition to the working condition, the elongated pull element is in a folded state in the transport condition and in an extended state in the working condition, the elongated pull element is configured to transfer a pull force in the working condition from the first frame element to the one of the further frame elements, the elongated pull element comprises load bearing fibers extending from the first coupler to the second coupler, the elongated pull element comprises at least one flexible part and at least two stiff parts along the length of the elongated pull element, the flexible part having a lower bending stiffness than the two stiff parts and with the flexible part being arranged between the two stiff parts, wherein at least a first section and a second section of the load bearing fibers extending through the at least two stiff parts are compressed into a more compact arrangement than a section of the load bearing fibers extending through the flexible part so that the elongated pull element folds at the flexible part to arrange the elongated pull element in the folded state.

* * * * *